United States Patent [19]

Kalkstein

[11] 4,271,331

[45] Jun. 2, 1981

[54] ANALOG PROCESSING SYSTEM FOR REAL-TIME CONVERSION OF THE FREQUENCY OF ANALOG SIGNALS

[75] Inventor: Arie Kalkstein, Herzlia, Israel

[73] Assignee: In-Mar Electronics, Tel Aviv, Israel; a part interest

[21] Appl. No.: 52,818

[22] Filed: Jun. 27, 1979

[51] Int. Cl.³ .......................... G06F 5/06; H04J 3/18
[52] U.S. Cl. .............................. 179/1 SH; 364/900; 179/15.55 T; 179/1 J
[58] Field of Search ............ 179/1 SH, 15.55 R, 1 J, 179/15.55 T; 370/101, 112; 364/200, 900; 360/8

[56] References Cited

U.S. PATENT DOCUMENTS

| 3,949,174 | 4/1976 | Sutton | 179/1 SH |
|---|---|---|---|
| 3,950,617 | 4/1976 | Dildy | 179/1 SH |
| 4,003,027 | 1/1977 | Di Matteo | 364/900 |
| 4,186,643 | 2/1980 | Nishibe et al. | 179/1 J |

Primary Examiner—Charles E. Atkinson
Assistant Examiner—E. S. Kemeny
Attorney, Agent, or Firm—Benjamin J. Barish

[57] ABSTRACT

An analog signal processing system is described for changing the frequency of analog signals in a real-time manner. The system includes at least two analog shift registers, (specifically, three analog shift registers), an input circuit connecting the input end of all the registers in parallel, an output circuit selectively connectable to the output ends of the registers, a high frequency clock pulse source, a lower frequency clock pulse source, and cyclically operable switching means effective to load from the input circuit at least one analog shift register at the rate corresponding to the frequency of one of the clock pulses, while unloading at least one other register into the output circuit at the rate corresponding to the frequency of the other clock pulses.

Two applications are described, for purposes of example. One application is as a hearing aid device to reduce the frequency of audio signals in a real-time manner for a person having a limited-frequency audibility. The other application is a communication device for the real-time transmission and reception of audio signals rendering them unintelligible except by receivers equipped with a processing system for reducing the frequency of the received signals.

5 Claims, 4 Drawing Figures

ANALOG PROCESSING SYSTEM FOR REAL-TIME CONVERSION OF THE FREQUENCY OF ANALOG SIGNALS

BACKGROUND OF THE INVENTION

The present invention relates to analog signal processing systems, and particularly to systems for changing the frequency of analog signals in a real-time manner. For purposes of example, the invention is described below with respect to two types of systems, namely as an aid to hearing by a person having a limited-frequency audibility, and as a means for communicating audio signals in a manner non-intelligible except by a properly equipped receiver. It will be appreciated, however, that the invention could also be used in other applications, for example in the analysis of transient signals.

With respect to the first of the above-mentioned applications, it is to be noted that the upper limit of human audibility is usually about 15-20 kHz, but many persons have a much more limited range and are not able to hear tones within this frequency range. The invention, as to be described more fully below, is particularly useful in this type of application for the real-time reduction of the frequency of audio signals to a range which a person, having such a hearing deficiency, is capable of hearing.

With respect to the second of the above-mentioned applications of the invention, various secret communication systems have been proposed for scrambling information transmitted, e.g. by a radio transmitter, so as to render the information unintelligible except by a properly equipped receiver. Such scrambling systems are quite costly and therefore have limited application. The invention may be used for simplifying and reducing the cost of secret communication systems.

BRIEF SUMMARY OF THE INVENTION

According to a broad aspect of the present invention, there is provided an analog processing system comprising at least two analog shift registers each capable of storing, under the control of loading clock pulses, an analog signal in the form of a plurality of analog samples, and of outputting them under the control of unloading clock pulses. The system further includes an input circuit connected to the input end of all the analog shift registers in parallel, and an output circuit selectively connectible to the output ends of the analog shift registers. The system further includes a source of high frequency clock pulses, a source of lower frequency clock pulses, and cyclically operable switching means effective, during one phase of each cycle, to connect at least one analog shift register to one source of clock pulses to load same at the rate corresponding to the frequency of that source, and to connect at least one other analog shift register to the other source of clock pulses and to the output circuit to unload the other register at the rate corresponding to the frequency of that source. The latter switching means are also effective, during another phase of each cycle, to change the connections with respect to the two sources of clock pulses, so that the analog shift register loaded in the first phase is now unloaded, and visa versa.

For the analog shift registers, there may be used the recently developed charge-transfer devices which operate by the movement of a charge packet from one capacitor stage to an adjacent capacitor stage by the application of clock pulses. Thus, an analog signal may be inputted at a first rate by the application of clock pulses having one frequency, and may be outputted at a second rate by the application of clock pulses having a second frequency. In such devices, while the inputted signal is sampled in time, as in conventional digital processing, the amplitude of the signal is retained in analog form. As one example, there may be used the Phillips TDA 1022, having 512 stages and operable with clock frequencies in the range of 5 kHz to 500 kHz. In many applications, it may be desirable to increase the number of stages by providing each analog shift register with two or more of such units.

As indicated earlier, the invention is particularly useful for changing the frequency of audio signals in a real-time manner. In such applications, the output circuit would further include a low-pass filter which substantially reconstructs the original analog signal but at the different frequency, determined by the frequency relationship of the two clock pulses.

One particularly useful application of the invention is as a hearing aid device to reduce the frequency of audio signals in a real-time manner, and thereby to aid those persons having a limited-frequency audibility. In such an application, the system would include two analog shift registers, and the switching means would be effective during each of two phases to load one register at the high-frequency clock pulse rate, while unloading the other register at the lower-frequency clock pulse rate.

When the system is used in the above-described hearing-aid application, the results are somewhat like recording an audio signal at one frequency and playing it back at a lower (e.g. one-half) frequency, except that in the present invention the frequency-division is effected in a real-time manner. That is to say, when the audio signal is recorded at one speed and played back at one-half speed, the play-back cannot start until the recording has been completed, and moreover, the play-back takes twice as long as for recording. In the present invention, however, the recording and play-back occur substantially simultaneously, although there is a very slight delay, in the order of milliseconds.

The invention may also be applied to increase the frequency of analog signals in a real-time manner, for example to transmit the signals at a sufficiently high frequency so as to be undetectable or unintelligible to a receiver not equipped with an approximate real-time low-frequency converter. In the high-frequency converter application, there would be at least three analog shift registers and at least three phases, the switching means being effective, during each of the three phases, to unload one analog shift register at the high-frequency clock pulse rate, while loading the other two registers at the low-frequency clock pulse rate.

Preferably, the frequency of the low-frequency clock pulses is one-half that of the high-frequency clock pulses. In such systems, therefore, the frequency change effected in a real-time manner is by a factor of "2". It may be desirable to increase this factor, which can easily be done, for example, by connecting a plurality of such system in tandem.

Further features, advantages and applications of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
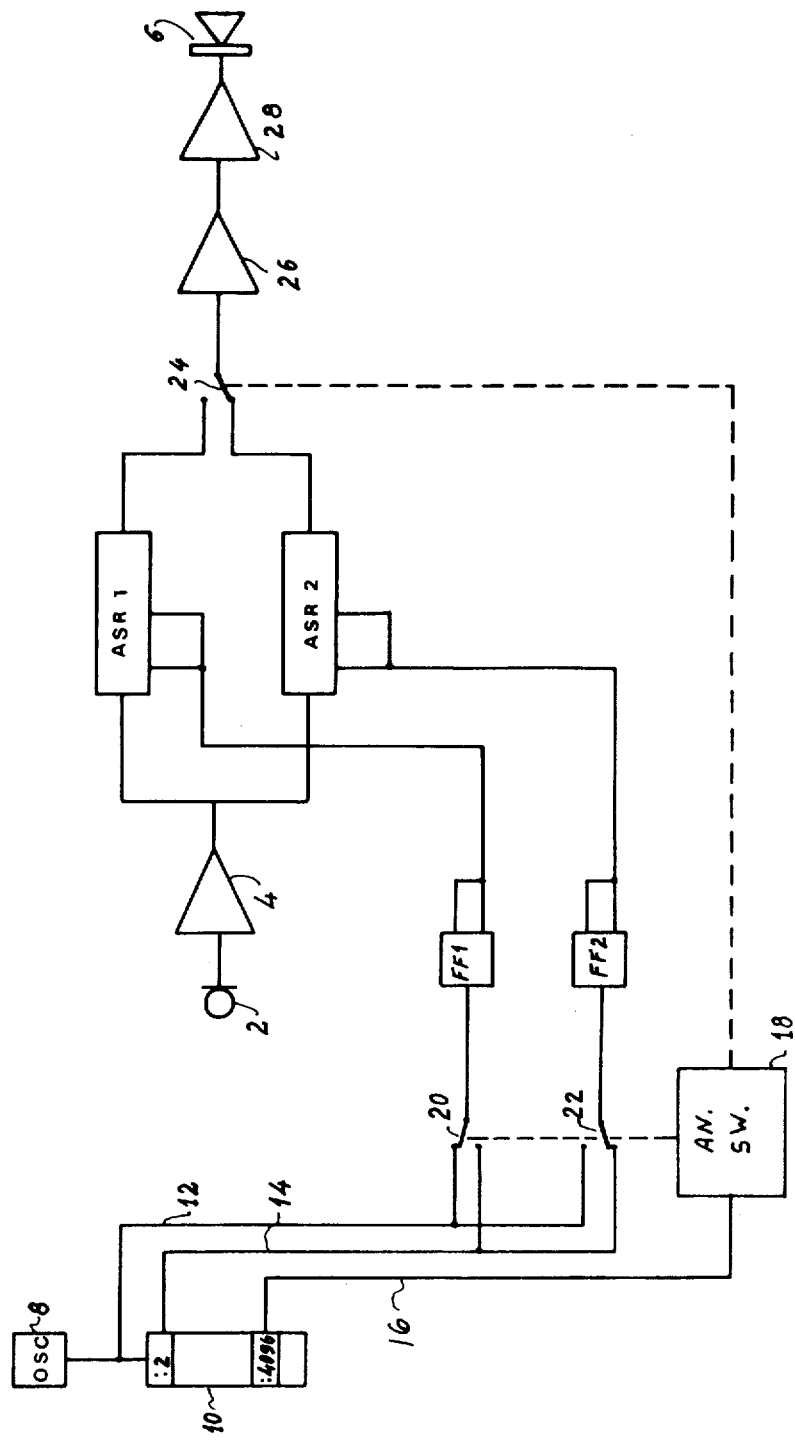
FIG. 1 is a block diagram illustrating, in generalized form, a real-time frequency-reducing circuit constructed in accordance with the invention.

With reference first to FIG. 1, there is shown a real-time frequency-reducing circuit particularly useful for reducing the frequency of audio signals for a person having a limited-frequency audibility. Briefly, the audio signals are applied to an input circuit including a microphone 2 and an amplifier 4, and are reproduced on a real-time basis, but at a lower frequency, in an output circuit including a speaker 6, e.g. a loud speaker or earphones. Thus, many of the high frequency tones in the originally-inputted audio signal, which might not have been heard by the person because of his limited-frequency audibility, will be reduced in frequency such that the person can hear them. Since this reduction in frequency of the originally-inputted audio signals occurs on a real-time basis, the person using the device hears the sound at substantially the same time as the sound is received by the microphone 2.

More particularly, the sounds are converted to electrical analog signals by microphone 2, are amplified by amplifier 4, and are then applied to two analog shift registers ASR1 and ASR2, connected in parallel to the input circuit. As mentioned above, these analog shift registers are known devices each capable of storing, under the control of loading clock pulses, the analog signals in the form of a plurality of analog samples, and of outputting them under the control of unloading clock pulses. As one example, there may be used for each of the analog shift registers ASR1, ASR2, two Phillips TDA 1022 units, each having 512 stages, thereby providing a total of 1024 stages for each of the shift registers.

The loading and unloading clock pulses controlling the analog shift registers are provided by an oscillator 8 and a frequency divider 10. Oscillator 8 outputs high frequency pulses via line 12, and frequency divider 10 outputs lower frequency pulses via line 14, being, in the described arrangement, one-half of the higher frequency pulses supplied via line 12. Frequency divider 10 further supplies another series of pulses at a rate 1/4096 the rate of the high-frequency pulses supplied by oscillator 8; these pulses, acting as switching pulses, are supplied via line 16 to a cyclically-operable analog switch 18 for controlling same in the manner to be described more particularly below.

Analog switch 18 cyclically controls three switching devices, namely switching device 20 controlling a first flip-flop FF1, switching device 22 controlling a second flip-flop FF2, and switching device 24 selectively connecting the output of the two analog shift registers ASR1 and ASR2 to the output circuit including speaker 6.

Flip-flop FF1 supplies the loading clock pulses and the unloading clock pulses to analog shift register ASR1. Thus, when it is connected by switching device 20 to line 12 supplying the high-frequency pulses from oscillator 8, it produces clock pulses of the same high frequency and supplies them to the loading gate of analog shift register ASR1 to load that register from the input circuit, including a microphone 2 and amplifier 4, at the high-frequency rate of the pulses on line 12. On the other hand, when flip-flop FF1 is connected by switching device 20 to line 14, it produces and supplies lower-frequency clock pulses to analog shift register ASR1 to unload that register at the rate corresponding to the lower-frequency of the pulses on line 14.

Flip-flop FF2 controlled by switching device 22 supplies the clock pulses to analog shift register ASR2 in a similar manner. That is, when flip-flop FF2 is connected by its switching device 22 to line 12, it supplies high-frequency clock pulses to load analog shift register ASR2 from the input circuit at the high-frequency rate corresponding to the frequency of the pulses on line 12; and when the flip-flop is connected to line 14, it unloads analog shift register ASR2 at the rate corresponding to the lower-frequency of the pulses on line 14.

Switching device 24, controlled by analog switch 18, selectively connects the output end of the two shift registers ASR1, ASR2 to the output circuit including speaker 6, such that only the register being unloaded is connected to the output circuit. The rate of operation of switching device 24 corresponds to the frequency of the pulses on line 16, which as indicated above, is much lower than the frequency of the pulses on either of lines 12 or 14.

The output circuit includes, in addition to speaker 6, also a low-pass filter 26 and an amplifier 28. The low-pass filter 26 receives the analog samples outputted by the analog shift register ASR1 or ASR2 connected to the output circuit via switching device 24, and from these analog samples it reconstructs the original analog signal but at a different frequency, determined by the frequency relationship of the two clock pulses supplied by the flip-flops FF1, FF2. Amplifier 28 amplifies this reconstructed analog signal before applying same to speaker 6 which converts same to sound. The outputted sound will thus correspond to and will occur substantially simultaneously with, the sound inputted into the microphone 2, but would be at a lower frequency, one-half in this example.

The operation of the system of FIG. 1 is illustrated in the following Table 1:

TABLE 1

| Phase 1 | Phase 2 |
| --- | --- |
| High-frequency loading ASR1 | High-frequency loading ASR2 |
| Low-frequency unloading ASR2 | Low-frequency unloading ASR1 |

The two phases are controlled by the cyclically-operable analog switch 18, which in turn is controlled by the switching pulses supplied to it by line 16. Thus, during Phase 1 (wherein the switching devices 20,22 and 24 controlled by analog switch 18 are in the positions illustrated in FIG. 1), it will be seen that flip-flop FF1 is connected to the high-frequency pulse line 12, so that it supplies high-frequency loading clock pulses to its analog shift register ASR1 loading same with analog samples of the amplified audio signals from microphone 2. During this same Phase 1, flip-flop FF2 is connected to the low-frequency pulse line 14, so that it supplies low-frequency unloading clock pulses to its analog shift register ASR2, unloading same at the low-frequency rate. Also during this Phase 1, switching device 24 connects the output end of analog shift register ASR2 to the output circuit, so that the analog samples unloaded from register ASR2 are fed to the output circuit.

The system remains in Phase 1 for a time interval sufficient to completely unload the analog shift register ASR2. Since this register is being unloaded at a slower (one-half) rate than the rate at which analog shift register ASR1 is being loaded, it will be appreciated that analog shift register ASR1 will overflow and will lose one-half the information loaded into it during this time interval. That is, one-half of the information will not be transmitted to the low-pass filter 26 in the output circuit. However the low-pass filter substantially reconstructs the original analog signal, so that the original sound inputted into the microphone 2 is outputted from speaker 6 but a lower frequency, namely at one-half the frequency of the inputted sound signal.

It will be appreciated that during Phase 2, the analog switch 18 switches the connections 20, 22, 24 so that the analog shift register ASR1 is now unloaded at the low-frequency of the pulses on line 14, and analog shift register ASR2 is now loaded at the high-frequency of the pulses on line 12. During this Phase 2, switching device 24 connects the output of analog shift register ASR2 to the low-pass filter 26 which filter reconstructs the original audio signal before it is amplified in amplifier 28 and outputted via speaker 6.

Phase 2 continues with the switching device 24 in the above-described position until analog shift register ASR2 completely unloads, at which time the analog switch 18 then actuates all the switching devices 20, 22, and 24 back to the positions illustrated in FIG. 1 to institute a new Phase 1.

Figure 2:
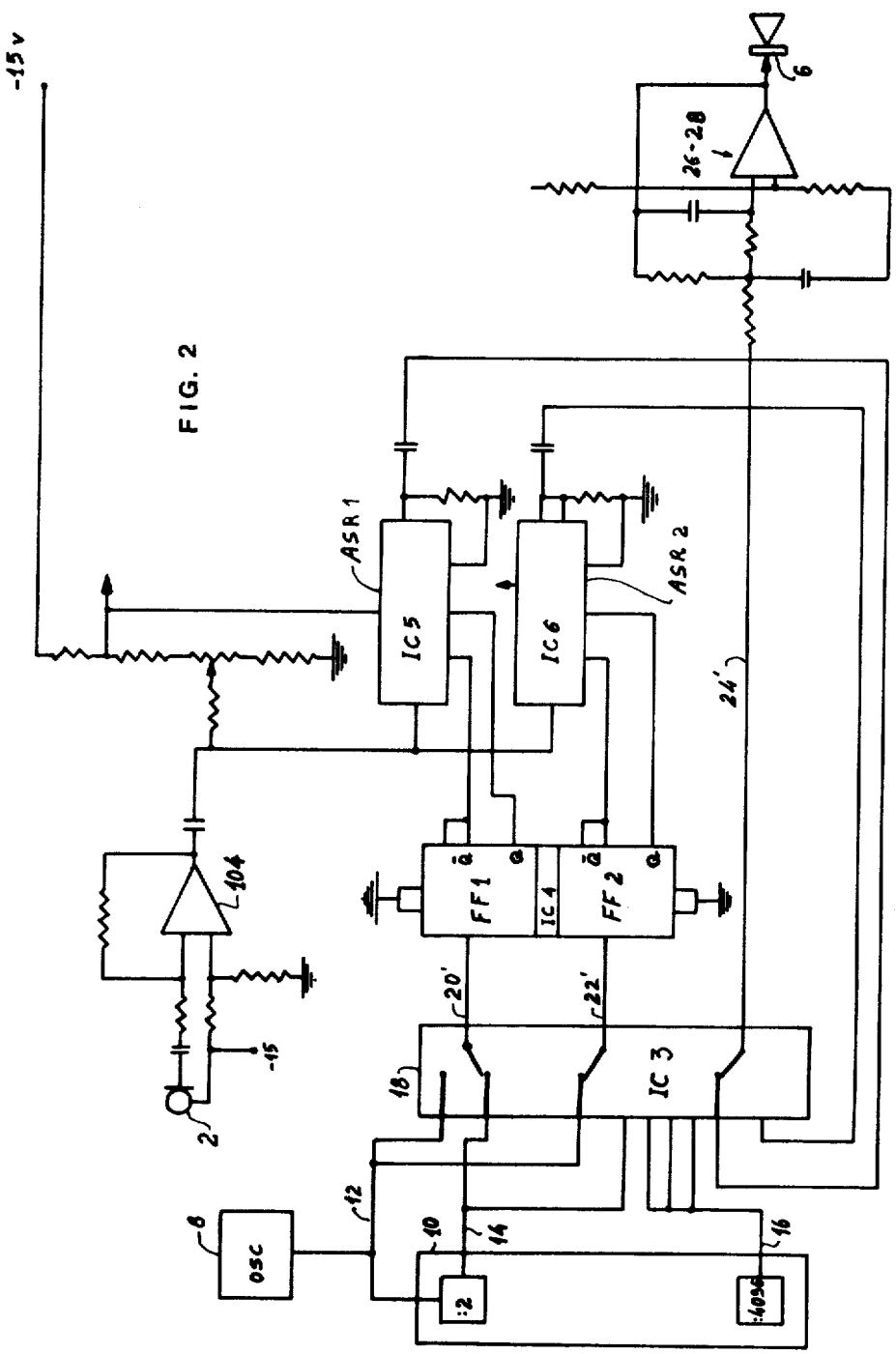
FIG. 2 is a block diagram illustrating one implementation of the system of FIG. 1.

FIG. 2 illustrates a specific implementation of the system of FIG. 1, with corresponding elements and components correspondingly numbered. Thus, oscillator 8 supplies the high-frequency pulses via line 12 to a cyclically-operable analog switch 18 which may be an integrated circuit (IC3) analog multiplexer (e.g., Motorola MC14053B) including the equivalent of the switching devices 20, 22 and 24. The outputs 20' and 22', corresponding to the outputs of the switching devices 20 and 22 in FIG. 1, are applied to the two flip-flop FF1 and FF2 both included in an integrated circuit (IC4), such as Motorola MC14013B. Flip-flip FF1 clocks analog shift register ASR1, which is in the form of an integrated circuit (IC5), e.g., Motorola TDA 1022; and flip-flop FF2 clocks analog shift register ASR2, which is the same type of integrated circuit (IC6). Each of these latter integrated circuits has 512 stages, and it is preferable to include, for each analog shift register, two such units so as to provide an analog shift register of 1024 stages for each.

Line 24' from the analog switch 18 represents the output end of the switching device 24 in FIG. 1 and feeds the analog time samples being unloaded from the analog shift register in the respective phase, to the combined low-pass filter and amplifier unit 26–28. The filter reconstructs the original audio signal, but at a reduced frequency (one-half in the above-described example), before it is amplified and converted back to sound in speaker 6.

For purposes of example, the high-frequency clock pulses may be at 15 kHz, the low-frequency clock pulses may be at 7.5 kHz, and the switching pulses may be at 7.32 Hz, whereby the registers are unloaded every 136 milleseconds.

Figure 3:
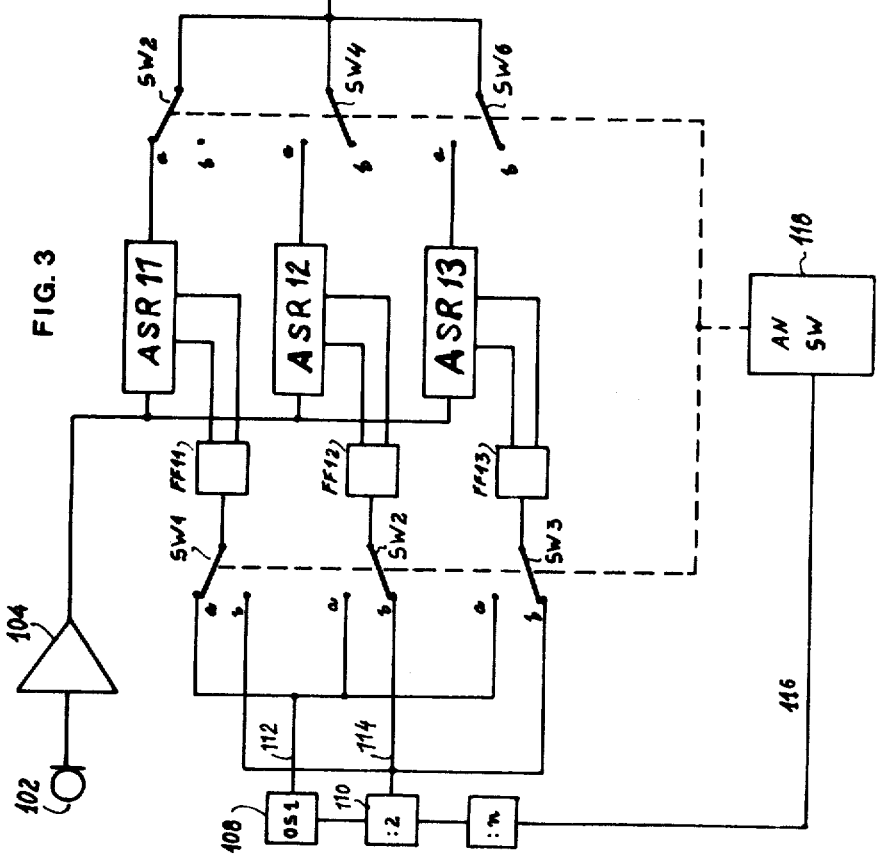
FIG. 3 is a block diagram illustrating a real-time frequency-multiplying circuit constructed in accordance with the invention.

Whereas FIGS. 1 and 2 illustrate the system applied to the real-time division of the frequency of an analog signal, the invention could also be applied to the real-time multiplication of the frequency of an analog signal. This is illustrated in FIG. 3. In the example of FIG. 3, the frequency is doubled, and therefore the system includes three phases of operation; three analog shift registers identified as ASR11, ASR12, and ASR13; and three flip-flops identified as FF11, FF12 and FF13. The analog signal is inputted to the three analog shift registers in parallel via microphone 102 and amplifier 104, and is eventually outputted via speaker 106. The high-frequency pulses are supplied by an oscillator 108 via line 112, and the low-frequency pulses are supplied by a frequency divider 110 via line 114. Frequency divider 110 also supplies the phase-switching pulses via line 116 to the cyclically operable analog switch 118.

Analog switch 118 controls a clock-control switching device and an output switching device for each of the analog shift registers.

Thus, with respect to shift register ASR11, analog switch 118 controls switching device SW1 to connect either the high-frequency pulses from line 112 or the low-frequency pulses from line 114 to its flip-flop FF11, which flip-flop controls the rate of loading and unloading of its respective analog shift register ASR11. In addition, analog switch 118 controls switching device SW2 at the output end of analog shift register ASR11, connecting same to the low-pass filter 126 in the output circuit whenever the analog shift register is being unloaded.

The same applies with respect to the other two analog shift registers ASR12 and ASR13. Thus, switching device SW3 controls flip-flop FF12 which determines the rate of loading and unloading of its analog shift register ASR12, and also controls switching device SW4 which connects the latter register to the output circuit when the register is being unloaded. Similarly, switching device SW5 controls its flip-flop FF13 which in turn controls the rate of loading and unloading of analog shift register ASR13, and also controls switching device SW6 which connects the output end of the latter register to the output circuit when the latter register is being unloaded.

As in the above-described embodiment of FIGS. 1 and 2, the output circuit includes, in addition to the low-pass filter 126, also an amplifier 128 and a speaker 106, e.g. ear-phones for individual use, or a loud speaker.

The operation of the system illustrated in FIG. 3 will be better understood by reference to the following Table 2.

TABLE 2

| Phase 1 | Phase 2 | Phase 3 |
| --- | --- | --- |
| High-frequency unloading ASR11 SW1:a SW2:a | Low-frequency loading ASR11 SW1:b SW2:b | Low-frequency loading ASR11 SW1:b SW2:b |
| Low-frequency loading ASR12 SW3:b SW4:b | High-frequency unloading ASR12 SW3:a SW4:a | Low-frequency loading ASR12 SW3:b SW4:b |
| Low-frequency loading ASR13 SW5:b SW6:b | Low-frequency loading ASR13 SW5:b SW6:b | High-frequency unloading ASR13 SW5:a SW6:a |

It will thus be seen that during Phase 1, contacts "a" of both switching devices SW1 and SW2 are operative.

Accordingly, analog shift register ASR11 will be unloaded into the output circuit at the high-frequency rate of the signals supplied from oscillator 108 via line 112.

During the same Phase 1, contacts "b" of both switching devices SW3 and SW4 are operative, and therefore analog shift register ASR12 will be loaded at the low-frequency rate of the signals supplied from the divider circuit 110 via line 114. Similarly during this Phase 1, contacts "b" of switching devices SW4 and SW5 will also be operative, so that analog shift register ASR13 will also be loaded at the low-frequency rate of the signals on line 114.

At the end of Phase 1, analog switch 118 actuates the above switching devices to initiate Phase 2, wherein contacts "b" of switching devices SW1 and SW2 are operative; contacts "a" of switching devices SW3 and SW4 are operative; and contacts "b" of switching devices SW5 and SW6 are operative. Accordingly, analog shift register ASR13 will be loaded at the low-frequency rate; analog shift register 12 will be unloaded at the high-frequency rate; and analog shift register ASR13 will be loaded at the low-frequency rate.

At the end of Phase 2, analog switch 118 actuates the switching devices to initiate Phase 3, wherein contacts "b" of switching devices SW1 and SW2 are operative, thereby causing analog shift register ASR11 to load at the low-frequency rate; contacts "b" of switching devices SW3 and SW4 are operative, thereby causing analog shift register ASR12 to be loaded at the low-frequency rate; and contacts "a" of switching devices SW5 and SW6 are operative, thereby causing analog shift register ASR13 to be unloaded at the high-frequency rate.

It will thus be seen that during each phase of the cycle, one of the analog shift registers is unloaded at the high-frequency rate, while the remaining two shift registers are loaded at the low-frequency rate. Thus, the sound originally inputted into the microphone 102 will be reproduced by the speaker 106 in a real-time manner, but at double the frequency of the original sound.

One application for the real-time frequency-multiplying circuit of FIG. 3 is in a secrecy communication system, wherein messages are transmitted at a high-frequency so as to be unintelligible by receivers unless equipped with a corresponding frequency-dividing circuit as illustrated for example in FIG. 1. In such a system, however, it would be desirable to multiply the frequency by a factor greater than "2". This can be done by connecting a plurality of the frequency-doublers of FIG. 3 and frequency-dividers of FIG. 1 in tandem.

Figure 4:
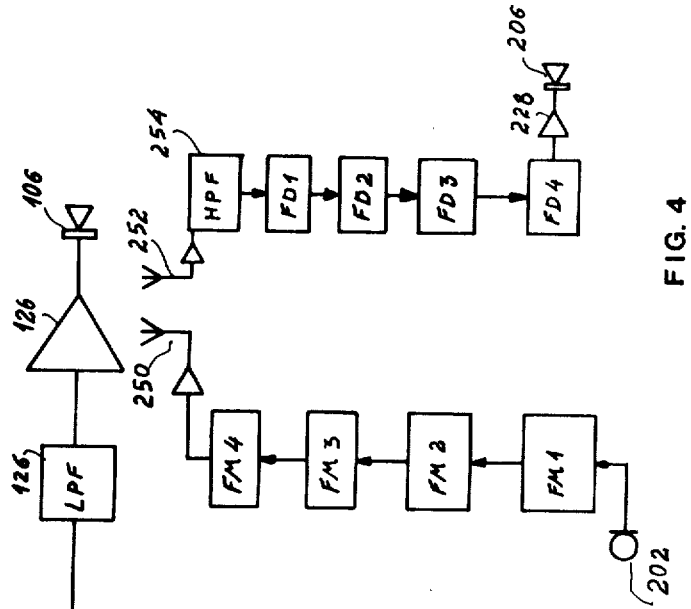
FIG. 4 is a block diagram illustrating a communication system constructed in accordance with the invention.

FIG. 4 illustrates one such arrangement. Thus, as shown in FIG. 4, there are four frequency-multiplier stages FM1–FM4, which thereby multiply the audio signals originally inputted into the microphone 202 by a factor of "16", the output being transmitted via antenna 250. The signals are received by receiver antenna 252, and are preferably passed through a high-pass filter 254 before being fed to the frequency-reducing circuit including four frequency-divider stages FD1–FD4, each corresponding to the system illustrated in FIGS. 1 or 2, before the signal is amplified in amplifier 228 and converted to sound by speaker 206.

Thus, a receiver not equipped with the frequency-reducing circuit described above will receive the original sound but at a frequency multiplied by a factor of "16", which will make the sound substantially unintelligible, if audible at all. However, a receiver equipped with the frequency-reducing circuit described above will automatically reduce the received signal by the factor of "16," and will therefore reproduce, in an audible and intelligible manner, the original sound and at the same frequency as the original sound.

While the invention has been described with respect to two preferred embodiments, it will be appreciated that many other variations, modifications and applications of the invention may be made.

What is claimed is:

1. An analog signal processing system, comprising:
   (a) three analog shift registers each capable of storing, under the control of loading clock pulses, an analog signal in the form of a plurality of analog samples, and of outputting them under the control of unloading clock pulses;
   (b) a source of high-frequency clock pulses;
   (c) a source of lower-frequency clock pulses;
   (d) an input circuit connected to the input end of all the analog shift registers in parallel;
   (e) an output circuit selectively connectable to the output ends of the analog shift registers; and
   (f) cyclically operable switching means effective:
      (i) during a first phase, to unload one register at the high-frequency clock pulse rate while loading a second and a third register at the low-frequency clock pulse rate.
      (ii) during a second phase, to unload said second register at the high-frequency clock pulse rate, while loading said first and third registers at the low-frequency clock pulse rate; and
      (iii) during a third phase, to unload said third register at the high-frequency clock pulse rate, while loading said first and second registers at the low-frequency clock pulse rate.

2. A system according to claim 1, wherein said output circuit includes a low-pass filter which substantially reconstructs the original analog signal but at a different frequency determined by the frequency relationship of the two clock pulses.

3. The system according to claim 1, wherein said input circuit includes a microphone for converting audio signals to electrical analog signals, and wherein said output circuit further includes a converter for converting the outputted analog signals to sound having a higher-frequency than the original audio signals.

4. A system according to claim 1, wherein the frequency of the lower-frequency clock pulses is one-half that of the high-frequency clock pulses.

5. Apparatus comprising a plurality of stages of analog signal processing systems, each stage being according to claim 1, all said stages being connected in tandem, the frequency of the lower-frequency clock pulses being one-half that of the high-frequency pulses.

* * * * *